United States Patent
Roth

(10) Patent No.: US 8,284,921 B2
(45) Date of Patent: Oct. 9, 2012

(54) METHOD FOR DISPERSING THE TRANSMISSION OF MASS NOTIFICATIONS

(75) Inventor: Joshua Roth, Pacific Palisades, CA (US)

(73) Assignee: Blackboard Connect Inc., Wilmington, DE (US)

( * ) Notice: Subject to any disclaimer, the term of this patent is extended or adjusted under 35 U.S.C. 154(b) by 1181 days.

(21) Appl. No.: 11/865,636

(22) Filed: Oct. 1, 2007

(65) Prior Publication Data

US 2009/0086956 A1    Apr. 2, 2009

(51) Int. Cl.
*H04M 7/00*    (2006.01)
(52) U.S. Cl. .......... 379/221.02; 379/221.03; 379/221.07
(58) Field of Classification Search ............. 379/221.02, 379/221.03, 221.07; 709/206
See application file for complete search history.

(56) References Cited

U.S. PATENT DOCUMENTS

| | | |
|---|---|---|
| 5,121,430 A | 6/1992 | Ganzer et al. |
| 5,260,986 A | 11/1993 | Pershan |
| 5,311,507 A | 5/1994 | Bedrossian |
| 5,359,645 A | 10/1994 | Katz |
| 5,442,688 A | 8/1995 | Katz |
| 5,463,685 A | 10/1995 | Gaechter et al. |
| 5,787,163 A | 7/1998 | Taylor et al. |
| 5,923,733 A | 7/1999 | Binns et al. |
| 5,949,851 A | 9/1999 | Mahaffey |
| 6,021,177 A | 2/2000 | Allport |
| 6,157,711 A | 12/2000 | Katz |
| 6,295,346 B1 | 9/2001 | Markowitz et al. |
| 6,346,890 B1 | 2/2002 | Bellin |
| 6,389,128 B1 | 5/2002 | Stademann |
| 6,434,223 B2 | 8/2002 | Katz |
| 6,463,462 B1 | 10/2002 | Smith et al. |
| 6,493,633 B2 | 12/2002 | Baron, Sr. et al. |
| 6,509,833 B2 | 1/2003 | Tate |
| 6,570,967 B2 | 5/2003 | Katz |
| 6,594,345 B1 | 7/2003 | Vinson |
| 6,643,368 B1 | 11/2003 | Watanabe |
| 6,694,132 B1 | 2/2004 | Lausi |
| 6,711,243 B1 | 3/2004 | Holt |
| 6,714,533 B1 | 3/2004 | Weich et al. |
| 6,714,642 B2 | 3/2004 | Dhir et al. |
| 6,778,496 B1 | 8/2004 | Meempat et al. |
| 6,816,878 B1 | 11/2004 | Zimmers et al. |
| 6,850,531 B1 | 2/2005 | Rao et al. |
| 6,904,265 B1 * | 6/2005 | Valdivia et al. .............. 455/12.1 |
| 6,963,557 B2 | 11/2005 | Knox |
| 6,968,174 B1 | 11/2005 | Trandal et al. |
| 6,978,002 B1 | 12/2005 | Cope et al. |
| 6,978,134 B1 | 12/2005 | Palviainen |
| 6,981,023 B1 | 12/2005 | Hamilton et al. |
| 7,016,477 B2 | 3/2006 | Contractor |
| 7,023,970 B1 | 4/2006 | Sealey et al. |
| 7,046,986 B2 | 5/2006 | Amano et al. |

(Continued)

*Primary Examiner* — Ahmad Matar
*Assistant Examiner* — Nafiz E Hoque
(74) *Attorney, Agent, or Firm* — David J. Pitman; Fulwider Patton LLP

(57) ABSTRACT

A method for allocating a call batch that includes a plurality of calls, to one out of a possible "n" providers for near simultaneous transmission by the one provider to a plurality of recipients, wherein each of the "n" providers has an overall capacity and a current level of use. In particular, the method comprises computing the potential free capacity of each provider by subtracting the call batch size from the actual capacity, and dividing the potential free capacity by the overall capacity to determine the proportion potential free capacity; and allocating the call batch to the provider having the largest proportion potential free capacity.

2 Claims, 5 Drawing Sheets

U.S. PATENT DOCUMENTS

| | | | |
|---|---|---|---|
| 2004/0004949 A1* | 1/2004 | Cayla et al. | 370/338 |
| 2005/0132051 A1* | 6/2005 | Hill et al. | 709/226 |
| 2010/0027769 A1* | 2/2010 | Stevens et al. | 379/88.17 |

* cited by examiner

METHOD FOR DISPERSING THE TRANSMISSION OF MASS NOTIFICATIONS

BACKGROUND OF THE INVENTION

The present invention relates to the dissemination of a mass of outgoing digital messages to a selected group of recipients by way of various communication methods. More specifically, the invention relates to a system and method for dispersing a mass of outgoing digital messages by delivering them to one or more of a plurality of external vendors (or "providers") that will be responsible for transmitting the messages to the ultimate recipients. The method for dispersing the messages is designed to mitigate bottlenecks that may arise due to limited or uneven capacity of the providers to transmit them.

Businesses and governmental entities, including municipalities and schools, are ever more reliant on communicating through the mass transmission of messages to their staff, citizens and family members of students to keep these constituencies apprized of important events, and sometimes of emergencies. For example, a school principal might need to inform the parent of every child that the school will be closed the next day due to some unforeseen event such as flooding, fire, or freezing conditions. Such messages might be sent to telephones, facsimiles, pagers, electronic mail (e-mail), and/or text messages. These messages will typically vary in their degree of importance, in the number of recipients, or in the immediacy with which they must be sent. Regardless of these varying factors, as a practical matter, each message being transmitted is typically placed in a batch of communications, or calls, by the processing system sending these messages. The processing system may then send a call batch, once it is assembled, to one out of a plurality of providers who specializes in transmitting them.

One of the shortcomings found to exist in the system described is that bottlenecks occur in which a provider that has been selected to transmit a call batch may not have sufficient available free capacity to substantially simultaneously transmit all the messages in the call batch that are forwarded to it for transmission. Or, even if it does have the capacity, its transmission may be unduly slow, or uneconomical.

Thus, it has been found that a method and system is needed to determine which provider out of a number of potential providers has the optimal capacity to receive a call batch for transmitting the call batch substantially simultaneously and, at the same time, with advantageous reduced cost to the management of a user system.

Thus, there is a need in the art for an appropriate dispersal system by which the foregoing problems may be avoided. The present invention addresses these and other needs.

SUMMARY OF THE INVENTION

The invention details a system and method whereby management of a system designed to transmit a mass of messages bundled into a call batch may select which provider from a plurality of providers is most advantageous for such transmittal.

In particular, the invention relates to a method for allocating a call batch that includes a plurality of calls, to one out of a possible "n" providers for near simultaneous transmission by the one provider to a plurality of recipients, wherein each of the "n" providers has an overall capacity and a current level of use. The method comprises preparing a call batch having a certain size, the call batch being configured for near simultaneous transmission to a plurality of recipients. The method then determines the overall capacity of each of the "n" providers and then determines the current level of use by each of the "n" providers. For each of the "n" providers, the current level of use is subtracted from the overall capacity to determine the actual capacity of each provider. For each of the "n" providers, whether the actual capacity is less than the call batch size is determined. Then, those providers that have an actual capacity less than the call batch size are eliminated from consideration. For each remaining provider that has not been eliminated from consideration, the potential free capacity of each provider is computed by subtracting the call batch size from the actual capacity, and dividing the potential free capacity by the overall capacity to determine the proportion potential free capacity. The call batch is allocated to the provider having the largest proportion potential free capacity. In one aspect of the invention, this is found to provide an advantageous selection of a provider that is suitably capable of transmitting the call batch.

In a further aspect of the invention, the process described above may be modified, in that the call batch size is modified by a factor equal to the actual price charged by a particular provider divided by the highest price charged by any provider. This biases the selection of the provider toward one having an advantageous capacity, but a lower cost.

In yet a further aspect of the invention, the process described above may be modified, in that the call batch size is modified by a factor equal to the smallest remaining minimum commitment owed to any provider divided by the actual remaining minimum commitment owed to a particular provider. This biases the selection of the provider toward one having an advantageous capacity, but having a high minimum cost commitment, thereby reducing wasted expense.

These, and other features of the invention, will be disclosed more fully in the detailed description of the preferred embodiments that follow, and the drawings attached.

DETAILED DESCRIPTION OF THE PREFERRED EMBODIMENTS

With reference to the drawings, which are provided by way of exemplification and not limitation, there is disclosed a preferred embodiment of a system for dispersal and delivery of mass messages.

Figure 1:
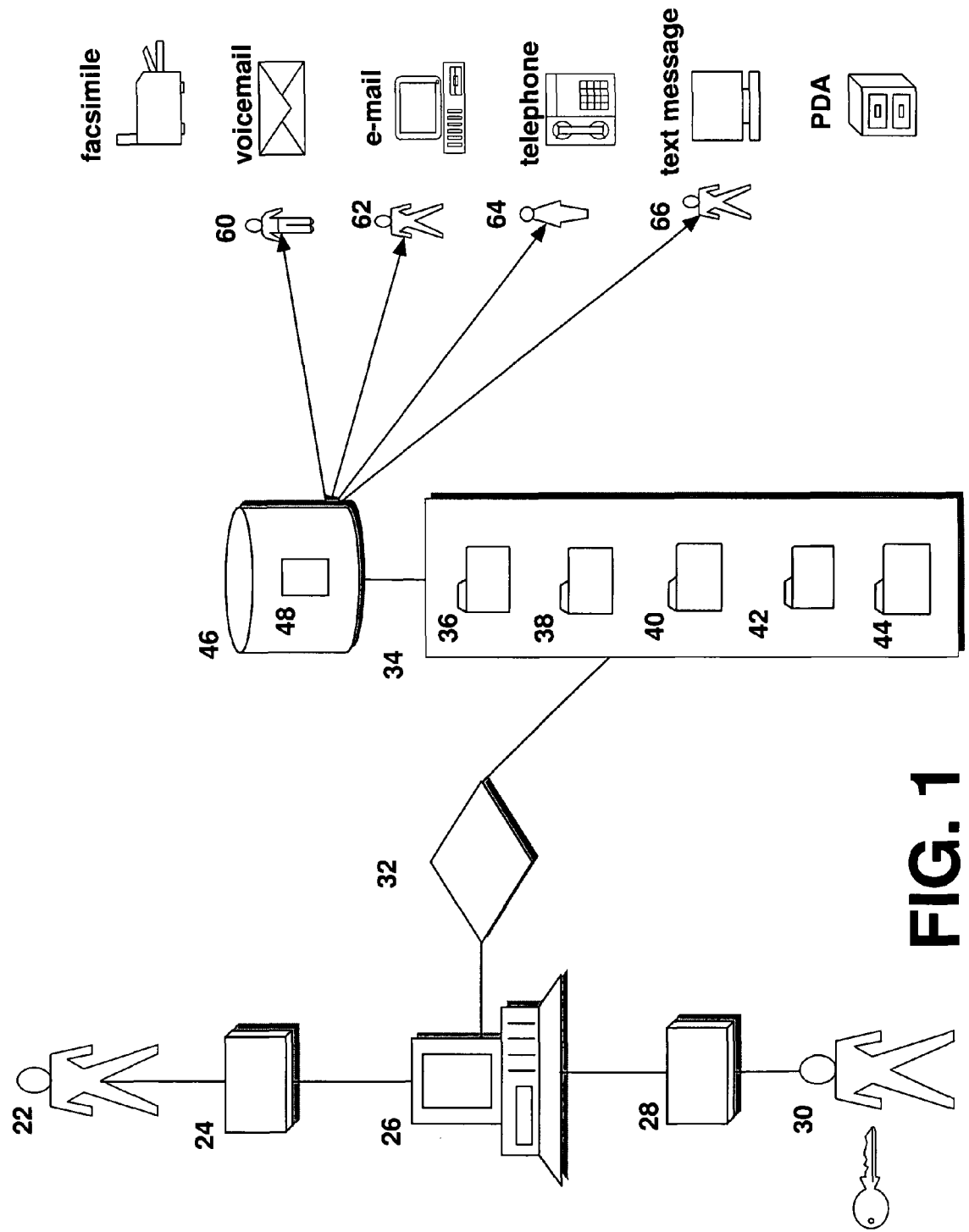
FIG. 1 is a schematic representation of a mass calling system having features of the present invention.

With reference to FIG. 1, a CPU or central processing unit 26 resides at the center of the system employed by the management of the present invention. The CPU is preconfigured to receive a message from a user 22, or initiator, of the system who may wish to send that message to a large number of recipients. The user will have acquired the right to send a message into the CPU 26 by earlier entering into a prior contract with the management of the system, entering his name on a list of legitimate users, paying the required fee if appropriate, and acquiring an entry code. The message the user sends to the CPU 26 may be sent in any one of a number of different formats via a transmission interface 24. For example the transmission interface 24 may be an ordinary land telephone, a cell phone, a computer for sending email, a computer with an internet connection, or it may be a facsimile machine for sending faxes, or the like. For example, a message might be: "Please clear your brush before fire season." The selected recipients might be a group of residents who live within a fire zone. The time and date to send might be tonight at 7:00 pm, and the methods of transmission to recipients selected by the user might include telephone and e-mail delivery.

Once the message is received by the CPU 26, it is stored by the CPU as a message file 32 to which there is associated a transmission data file 34 for later use, as set forth more fully below. Firstly, it may be noted that if the message received is an ordinary voice message via an interface 24 which is a telephone, the analogue voice signal may be converted to a digital sound file such as a .wav file and stored in the CPU as such. If the message received via the interface 24 is an email, it may be stored in the CPU as a .txt file, but it may also be converted to a sound file using TTS (text-to-speech) software. If the message is received as facsimile, it may be stored in the CPU as a .pdf file. All of these are stored pending distribution to the appropriate recipients in the appropriate form.

Once the message file 32 is stored in the CPU, it is associated with the transmission data file 34 which is structured to include a number of data sets that will later assist in controlling the transmission of the message file 32. For example, the user may insert information into the data sets by entering key strokes (telephone key, computer key, etc) in response to queries from the CPU as to what information should be entered in the data sets. The data sets will then be associated with the message file, as described. The information in the data sets may include the following: A time set 36 contains information relating to the time the message is scheduled for distribution. A recipient set 38 contains information relating to the class of recipients the message is intended to reach. For example, the recipients may be all the parents of students at a school between $6^{th}$ and $8^{th}$ grades. A location set 40 contains information relating to the geographical location the message is intended to reach. For example, the recipients may be all the residents in a town living on one side of a river, or next to a combustible forest. Further sets may be generated from information provided in preceding sets. For example, a number set 42 may be generated by the CPU 26 from the information entered into the recipient set 40, wherein the CPU calculates the number of intended recipients of the message, and enters that number into the number set 42 for later use, as described below. A sender identity set 44 may contain the identity of the user 22 who created the message, and information relating to the status and rights of that user 22. The status and rights of the user would be obtained from the code entered by the user to access the CPU 26 in order to leave the message. For example, the user identity set 44 may indicate that the user is the principal of a school who would legitimately want to reach a large audience of parents of students at the school; or it may indicate that the user is a teacher of $8^{th}$ grade, who would typically want to reach only the parents of students in her $8^{th}$ grade class, or perhaps all the $8^{th}$ grade students in the school, but whose legitimate interest would not include communicating with the parents of all the students at a school.

Once the message file 32 is created in the appropriate plurality of formats (e.g., .wav, .txt, or .pdf) and is associated with the transmission data file 34 with its data sets, the CPU stores the message and associated data file in a delivery interface 46. The delivery interface 46 is configured to hold the message in storage until a triggering event occurs, as more fully described below.

When such triggering event occurs, the delivery interface 46 causes the message to be distributed, according to known methods, to a mass of recipients, e.g. recipients 60-66. (FIG. 1) Within the delivery interface 46 in the CPU, each recipient of the message will have already been associated with a means of transmission according to a prior request by made by each potential recipient to the management of the system. Thus, for example, recipient 60 may have requested to be associated with a means of transmission by facsimile, recipient 62 may be associated with a means of transmission by voicemail, recipient 64 may be associated with a means of transmission by e-mail, recipient 66 may be associated with a means of transmission by text message, or pager, and so on. Thus, the CPU is configured to transmit the message in appropriate format (e.g. .wav, .txt, .pdf) to each recipient, according to known method.

The result is that, once the triggering event occurs, a single message (having been delivered to the CPU 26 by an enabled user 22 possessing an access code) in the form of a batch of calls or "call batch" is eventually transmitted as a near simultaneous event, to masses of recipients identified by the user 22. This capability of the system places enormous power in the hands of an institution or group of people to keep classes of citizens informed of events that are directly relevant to them on a real time basis.

Figure 2:
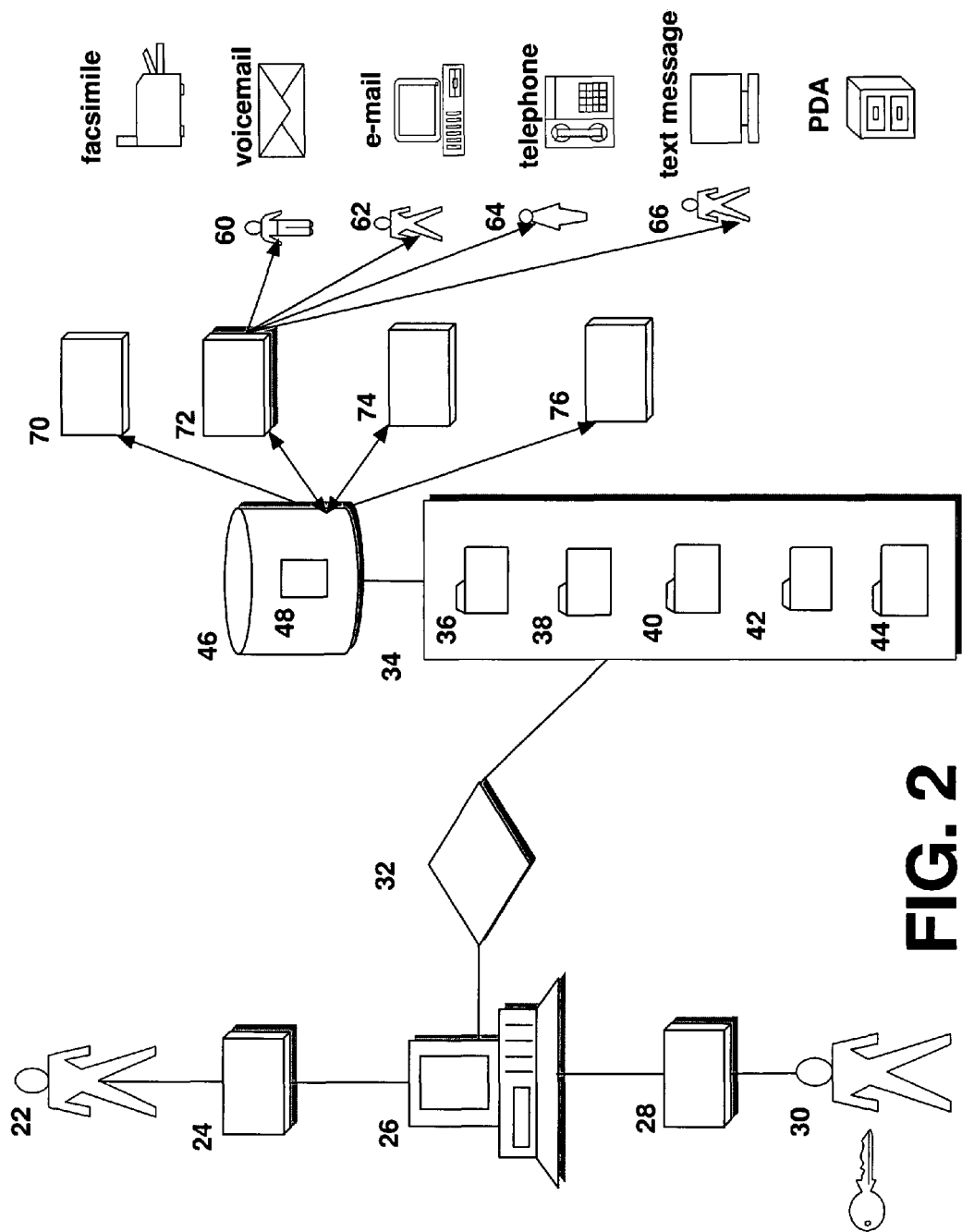
FIG. 2 is a schematic representation of a mass calling system having additional features of the present invention.

However, with reference to FIG. 2, the described system and method may be made even more effective if the delivery interface 46 is configured so that it does not itself hold the batch of messages, or call batch, in storage until a triggering event occurs, but is configured rather to send the message to one of a plurality of providers 70, 72, 74, 76, etc., with an instruction for that provider to send the message to the recipients immediately upon receipt in a novel aspect of the present invention. The CPU is configured to decide which one of the plurality of providers is to be chosen for transmitting the call batch.

Figure 3:
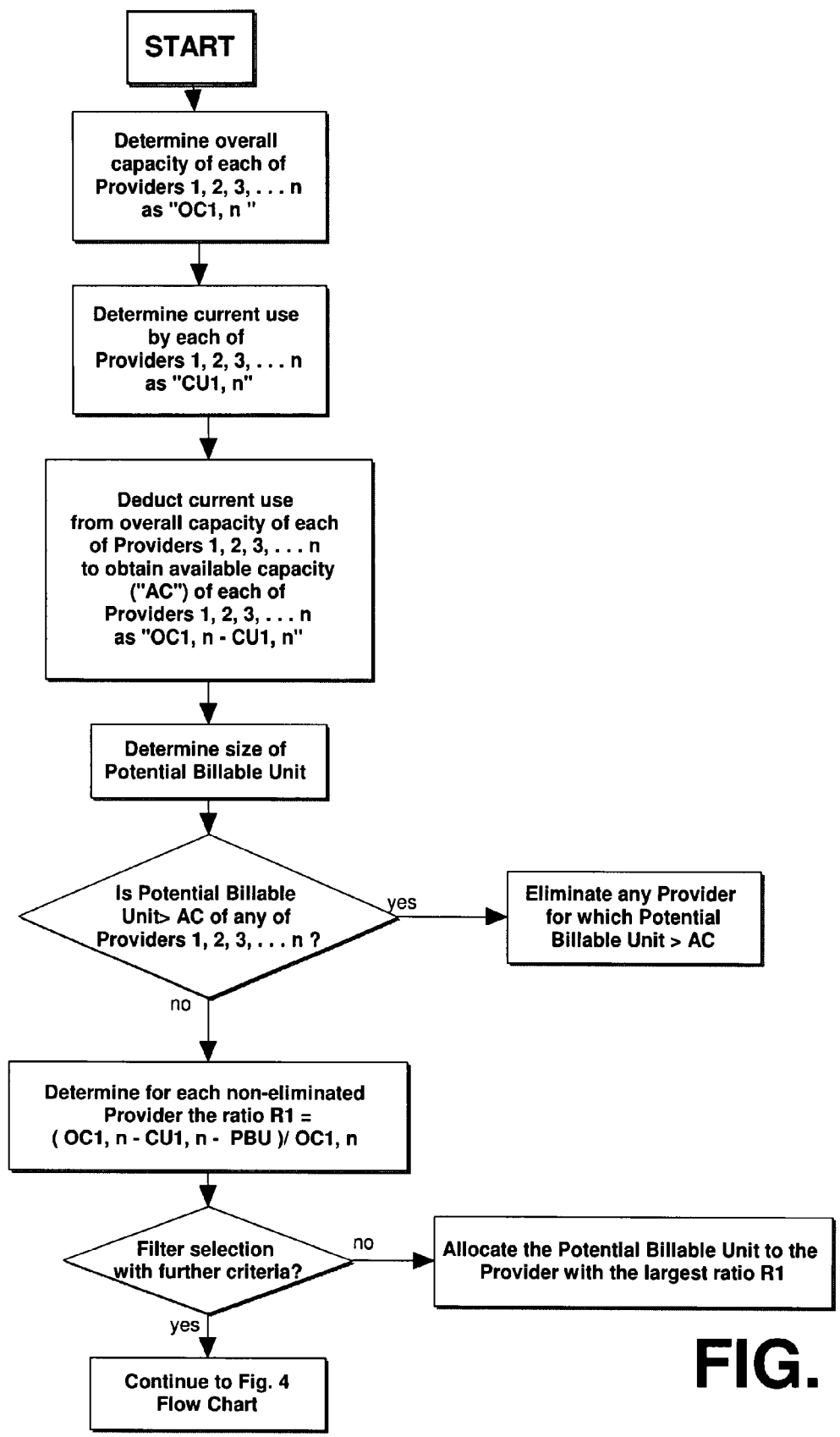
FIG. 3 is a flow chart showing aspects of the present invention.

Therefore, a novel system and method is described below to overcome problems found in the prior art. With reference to FIG. 3 there is described an aspect of the invention in which the CPU performs a novel logical decision sequence to determine which provider out of a possible "n" providers should be selected to transmit the message in order to optimize certain parameters. It has been found that this sequence results in transmission of a call batch that is rapidly and reliably executed with a diminished likelihood of calls being blocked by switching networks or providers.

According to a first aspect of this method, the CPU first assembles information identifying the overall capacity of each of "n" providers, 1, 2, 3, . . . n, signified as $OC_{1,n}$, wherein the providers are exemplified in FIG. 2 as 70, 72, . . . 76. This information is available to the CPU via feedback during operation of the CPU.

Next, the CPU assembles information identifying how much of each of the capacity of each of the "n" providers is being currently used, signified as $CU_{1,n}$. Again, this information is available to the CPU via feedback during operation of the CPU. The current use by each provider is then deducted from the overall capacity of each provider (i.e., $OC_{1,n} - CU_{1,n}$), thus identifying how much capacity each provider has free for use as Actual Capacity ("AC") in sending a call batch, in which the call batch requires a certain minimum processing capacity referred to as the "potential billable unit" (or "PBU") of that batch. The PBU is also referred to herein as the "call batch size" as it reflects the amount of processing capacity that will be required to process the entire batch. In a preferred method, the PBU may be calculated by rounding up to one minute in duration any call requirement that is less than one minute, and to round upwardly to one tenth of a minute any call requirement that is more than a minute. Thus for example, 45 seconds will be rounded to one minute, and 80 seconds will be rounded to 1.4 minutes. All calls in a batch are then summed according to this preferred method.

A check is made for each of the 1, 2, 3, . . . n providers whether $OC_{1,n}-CU_{1,n}$ is greater than the PBU for the pending batch of calls. For those providers that do not satisfy this check (i.e. they do not have enough Actual Capacity to receive and send the entire batch of calls or PBU), they are noted as being ineligible, and they are excluded from further consideration as potential providers for sending the pending PBU.

Finally, a calculation is performed to identify which of the providers, that have not been eliminated as candidates for sending the PBU, would have the greatest proportion of their capacity remaining in the event the PBU is allocated to that provider. In other words, the ratio $R1=(OC_{1,n}-CU_{1,n}-PBU)/OC_{1,n}$ is calculated for each remaining provider. Once this determination has been made, the PBU is transmitted to the provider with the greatest ratio $R1$, or proportion of potential free capacity. Thus, it has been found that this method of allocation produces a reliable provider selection in which the selected provider is capable of transmitting the batch speedily and, typically, with a diminished likelihood of calls being blocked by switching networks or providers. The process of the invention may end there, or, further types of selective filters may be applied to optimize other parameter of a provider in relation to a particular PBU.

Figure 4:
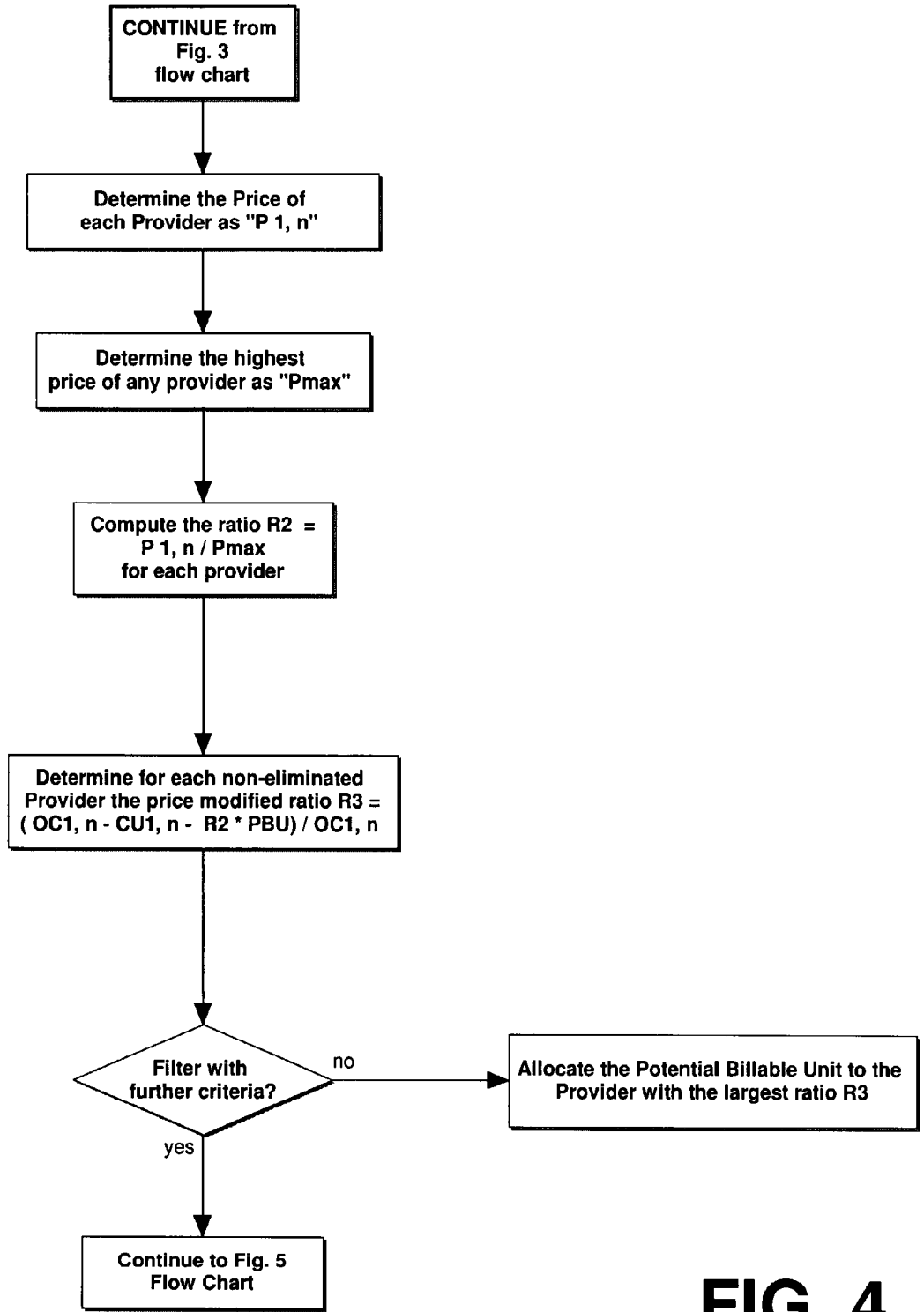
FIG. 4 is a flow chart showing further aspects of the present invention.
Figure 5:
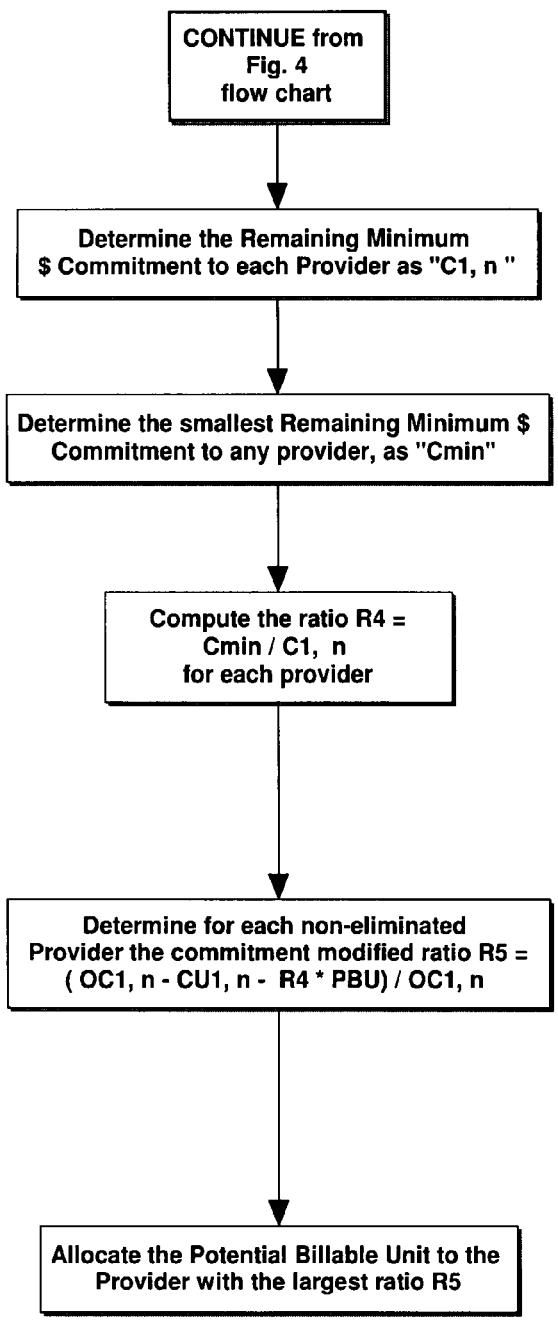
FIG. 5 is a flow chart showing yet further aspects of the present invention.

Turning now to FIGS. 4 and 5, there is described a further aspect of the present invention wherein additional selective filters are placed upon the ultimate selection of a provider for transmitting the call batch. The next aspect of the invention, exemplified in FIG. 4, shows how the selection of a provider may be further biased toward cost efficiency in addition to being optimized for the provider's capacity to receive and transmit a call batch as above described. In this aspect of the invention, selection of the provider is made under a modified sequence, in which the size of the PBU in the algorithm for $R1$ is adjusted to take account of price differentials between the various providers. Thus, according to this aspect, the CPU first determines the price that each provider will charge for transmitting the call batch in question, as P1, 2, 3, . . . n. Next the CPU determines the highest price of any provider for that call batch, Pmax. By dividing P1, 2, 3, . . . n by Pmax, a ratio $R2$ is determined which represents a weighting factor that is multiplied by the PBU so that $R2*PBU$ is subtracted from the actual capacity of each provider rather than merely PBU, as in the earlier embodiment of the invention. Thus, by this modification to the formula for selection, the ratio $R3$ is determined in which $R3=(OC_{1,n}-CU_{1,n}-R2*PBU)/OC_{1,n}$. If the provider with the largest ratio $R3$ is selected for transmitting the call batch, this has the result that a provider with a lower cost of transmission will receive a bias in its favor that will be blended into the overall decision criterion used in the previous embodiment. It has been found that the method of biasing the selection process described in this aspect achieves an advantageous cost effect on a series of dispersal decisions that have also been made based on advantageous capacity.

Turning now to yet a third aspect of the invention, exemplified in FIG. 5, an alternative factor may be blended into the overall decision criterion to bias the final decision in favor of a different cost consideration, namely, the level of contractual minimum payment undertakings that have been made to the individual providers 1, 2, 3, . . . n. In this aspect, the CPU determines the remaining minimum dollar commitment to each provider as MC 1, 2, 3 . . . n. Next the CPU determines the smallest remaining minimum dollar commitment to any of the providers, as MCmin. The CPU then computes the ratio $R4$ as MCmin/(MC 1, 2, 3, . . . n) for each provider, and modifies the basic algorithm (i.e., the basic algorithm as shown by $R1$) to the ratio $R5$ by multiplying the PBU by $R4$ in the formula $R5=(OC_{1,n}-CU_{1,n}-R4*PBU)/OC1,n$. It will be appreciated that $R4$ will always be smaller than, or equal to, one. The provider is then selected as the one with the largest ratio $R5$, which biases the selection toward a provider that has the largest remaining minimum dollar commitment. In this way, the selection of a provider is biased toward one which, in addition to having an advantageous capacity for transmitting the call batch, is one for which a large remaining minimum dollar commitment exists, and in respect of which there is therefore a greater desire to send the call batch for transmission so as to minimize wasted payment. In this way wastage is minimized by reducing the unproductive payment that may be required to be made to a provider for which the minimum commitment may not be satisfied.

In the manner thus described, the management of a message sending system may configure the system to utilize intelligent dispersal techniques as well as pre-determined capacity and provider information according to the methods set forth above as preferred methods of dispersal control.

The embodiments have been described in detail with particular reference to certain preferred embodiments, thereof, but it will be understood that variations and modifications may be effected within the scope of the embodiments, especially to those skilled in the art.

I claim:

1. A method for sending a call batch that includes a plurality of calls, to one out of a possible "n" providers for near simultaneous transmission by the one provider to a plurality of recipients, wherein each of the "n" providers has an overall capacity, a current level of use, and an actual price charged for each particular call batch, the method comprising;

preparing, within a central processing unit, a call batch having a certain size (PBU), the call batch being configured for near simultaneous transmission to a plurality of recipients;

determining the overall capacity of each of the "n" providers ($OC_{1,n}$);

determining the current level of use by each of the "n" providers ($CU_{1,n}$);

for each of the "n" providers, subtracting the current level of use from the overall capacity to determine the actual capacity ($AC_{1,n}$) of each provider;

for each of the "n" providers, determining whether the actual capacity is less than the call batch size;

eliminating from consideration those providers that have an actual capacity less than the call batch size;

modifying the call batch size by a factor equal to the actual price charged by a particular provider ($P_{1,n}$) divided by the highest price charged by any provider ($P_{max}$) to produce a price modified call batch size;

for each remaining provider that has not been eliminated from consideration, computing, by using the central processing unit, a proportion price modified potential free capacity of each provider by subtracting the price modified call batch size from the actual capacity of each particular provider, and dividing the result by the overall capacity of each particular provider according to the relationship $(OC_{1,n}-CU_{1,n,-P1,n}\times PBU/P_{max})/OC_{1,n}$; and by using the central processing unit, allocating the call batch to the provider having the largest proportion price modified potential free capacity, and sending the call batch from the central processing unit to the allocated call batch provider; and transmitting the calls from the call batch provider to the plurality of recipients.

2. A method for sending a call batch that includes a plurality of calls, to one out of a possible "n" providers for near simultaneous transmission by the one provider to a plurality of recipients, wherein each of the "n" providers has an overall capacity, a current level of use, and an actual price charged for each particular call batch, the method comprising;

preparing, within a central processing unit, a call batch having a certain size (PBU), the call batch being configured for near simultaneous transmission to a plurality of recipients;

determining the overall capacity of each of the "n" providers ($OC_{1,n}$);

determining the current level of use by each of the "n" providers ($CU_{1,n}$);

for each of the "n" providers, subtracting the current level of use from the overall capacity to determine the actual capacity ($AC_{1,n}$) of each provider;

for each of the "n" providers, determining whether the actual capacity is less than the call batch size;

eliminating from consideration those providers that have an actual capacity less than the call batch size;

modifying the call batch size by a factor equal to the smallest remaining minimum commitment owed to any provider ($MC_{1,n}$) divided by the actual minimum remaining commitment owed to a particular provider ($MC_{min}$) to produce a commitment modified call batch size;

for each remaining provider that has not been eliminated from consideration, computing, by using the central processing unit, a proportion commitment modified potential free capacity of each provider by subtracting the commitment modified call batch size from the actual capacity of each particular provider, and dividing the result by the overall capacity of each particular provider according to the relationship ($OC_{1,n}$–$CU_{1,n}$–$MC_{min}\times$ PBU/$MC_{1,n}$)/$OC_{1,n}$; and by using the central processing unit, allocating the call batch to the provider having the largest proportion commitment modified potential free capacity; and sending the call batch from the central processing unit to the allocated call batch provider; and transmitting the calls from the call batch provider to the plurality of recipients.

* * * * *